(12) United States Patent
Choi et al.

(10) Patent No.: US 11,303,316 B2
(45) Date of Patent: Apr. 12, 2022

(54) APPARATUS AND METHOD FOR WIRELESS COMMUNICATION

(71) Applicants: Nanyang Technological University, Singapore (SG); Massachusetts Institute of Technology, Cambridge, MA (US)

(72) Inventors: Pilsoon Choi, Cambridge, MA (US); Dimitri Antoniadis, Cambridge, MA (US); Chirn Chye Boon, Singapore (SG); Eugene A. Fitzgerald, Cambridge, MA (US)

(73) Assignees: Nanyang Technological University, Singapore (SG); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/052,555

(22) PCT Filed: May 10, 2019

(86) PCT No.: PCT/SG2019/050262
§ 371 (c)(1),
(2) Date: Nov. 3, 2020

(87) PCT Pub. No.: WO2019/221670
PCT Pub. Date: Nov. 21, 2019

(65) Prior Publication Data
US 2021/0250057 A1    Aug. 12, 2021

Related U.S. Application Data

(60) Provisional application No. 62/673,150, filed on May 18, 2018.

(51) Int. Cl.
*H04B 1/40* (2015.01)
*H04B 7/0413* (2017.01)

(52) U.S. Cl.
CPC ............. *H04B 1/40* (2013.01); *H04B 7/0413* (2013.01)

(58) Field of Classification Search
CPC ...... H04B 7/0413; H04B 1/0064; H04B 1/38; H04B 1/3827; H04B 1/40; H04L 25/0204;
(Continued)

(56) References Cited

U.S. PATENT DOCUMENTS

2008/0159243 A1    7/2008  Rofougaran
2013/0272220 A1*  10/2013  Li ....................... H04B 7/0848
                                                              370/329
(Continued)

FOREIGN PATENT DOCUMENTS

CN    106817134 A    6/2017
WO    2017083514 A1  5/2017

OTHER PUBLICATIONS

Zargari et al. "a single-chip dual-band Tri-mode CMOS transceiver for IEEE 802.11a/b/g Wireless LAN" Dec. 2004 (Year: 2004).*
(Continued)

*Primary Examiner* — Rahel Guarino
(74) *Attorney, Agent, or Firm* — Gesmer Updegrove LLP (57) ABSTRACT

An apparatus and method for wireless communication, and a method of fabricating the apparatus. The apparatus comprises two or more transceiver array groups, each transceiver array group comprising one or more radio frequency, RF, circuits, and one or more RF front end, RF FE, circuits; wherein the transceiver array groups are configured to operate at different frequencies; wherein the transceiver array groups are configured to be connected to one corresponding digital baseband processor; and wherein the transceiver array groups comprise at least one first transceiver array group configured to operate at cm wavelength or
(Continued)

larger. Preferably, the transceiver array groups comprise at least one second transceiver array group configured to operate at mm wavelength.

19 Claims, 6 Drawing Sheets

(58) Field of Classification Search
   CPC .......... H01Q 21/0025; H01Q 25/008; H01Q 3/2605
   See application file for complete search history.

(56) References Cited

U.S. PATENT DOCUMENTS

| | | | |
|---|---|---|---|
| 2016/0248451 A1* | 8/2016 | Weissman | H04W 72/0453 |
| 2016/0330795 A1* | 11/2016 | Choi | H01L 29/7787 |
| 2018/0269919 A1* | 9/2018 | Gharavi | H01Q 1/521 |

OTHER PUBLICATIONS

International Search Report and Written Opinion dated Jul. 31, 2019 in related PCT Application No. PCT/SG2019/050262.
Zargari M. et al., A Single-Chip Dual-Band Tri-Mode CMOS Transceiver for IEEE 802.11a/b/g wireless LAN. IEEE Journal of Solid-State Circuits, Dec. 12, 2004. vol. 39, No. 12, pp. 2239-2249.
Shaikh S. A., Emerging III-V Semiconductor Compound Materials for Future High-Speed and Low Power Applications: A Review and Challenges. International Journal of Innovative Research in Science, Engineering and Technology, Feb. 28, 2017, vol. 6, No. 2, pp. 1929-1935.
Extended European Search Report dated Jan. 18, 2022 issued in related EP Application No. 19803243.

* cited by examiner

(a) Type-1 RF transceiver (b) Type-2 RF transceiver

APPARATUS AND METHOD FOR WIRELESS COMMUNICATION

PRIORITY INFORMATION

This application is a 371 of PCT Application No. PCT/SG2019/050262 filed May 10, 2019, which claims priority from Provisional Patent Application No. 62/673,150 filed May 18, 2018, their entire contents and substance of which are herein incorporated by reference.

FIELD OF INVENTION

The present invention relates broadly to and apparatus and method for wireless communication, and in particular to an integrated wireless transceiver for multiple carriers and antennas.

BACKGROUND

Any mention and/or discussion of prior art throughout the specification should not be considered, in any way, as an admission that this prior art is well known or forms part of common general knowledge in the field.

The next-generation mobile network, 5G, will need to handle the massive scale of Internet-of-Things (IoT) devices and challenging connectivity requirements of diverse devices, sensors, and applications. It will also provide high reliability and availability for autonomous cars and high precision, mission-critical industrial devices in real-time by means of less-than-1 ms latency. Moreover, as a revolution from 4G long term evolution (LTE), 5G will provide the download speeds of up to 20 Gbps. 5G new radio (NR) is a true 5G native technology that addresses the need for the above new radio access technology. 5G will also provide truly ubiquitous network in the most challenging and remote areas of the world, connecting billions of Internet of Things (IoT) devices with a wide variety of speed and data volume requirements. However, realizing a 5G NR especially in a mobile device is very challenging since it needs to be implemented with many emerged technologies, such as carrier aggregation (CA), multiple input multiple output (MIMO), and mm-Wave for extremely high data rates and robustness. For example, 5G will use both sub-6 GHz and mm-Wave frequencies with the above emerged technologies for seamless user experience, which requires multiple radio frequency (RF) channels causing large area and power consumption. Thus, high level of integration of 5G NR is crucial for realizing it on a smartphone or a user equipment (UE).

Figure 1:
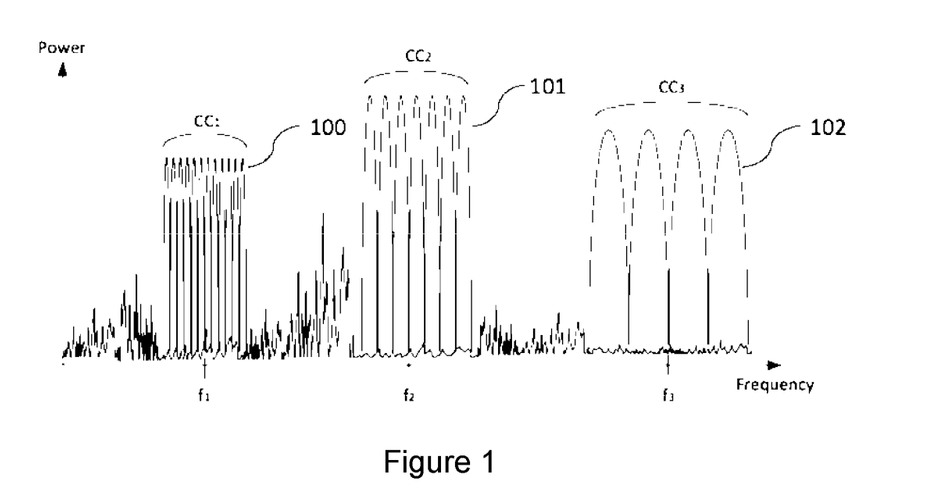
FIG. 1 shows a graph illustrating carrier aggregation (CA): transmission of multiple carrier components (CCs) at different RF frequencies.

Speeds of up to 20 Gbps will be achieved by 5G NR in which a combination of innovations such as carrier aggregation (CA), massive multiple input multiple output (MIMO), and high level of quadrature amplitude modulation (QAM) is implemented. FIG. 1 shows the concept of CA of three carrier components (CCs) with different bandwidth and carrier frequencies, i.e. $CC_1/f_1$, $CC_2/f_2$ and $CC_3/f_3$. Since it is based on orthogonal frequency division multiplexing (OFDM) communication, each CC can accommodate a different number of subcarriers of its OFDM signal with different subcarrier e.g. 100, 101, 102 spacing, depending on the data rates requirement and frequency availability at the time of data transmission. Assuming that $CC_3$ in FIG. 1 is in the mm-Wave frequency range, it could occupy wider bandwidth due to the plenty of frequency resources in mm-Wave frequencies and spatial multiplexing technique using antenna beam forming.

Available carrier frequency and bandwidth resources dynamically change in real communication environment. To support carrier aggregation in such dynamic conditions, different number of RF transceivers in different frequency bands (e.g. sub-1 GHz, 2.4 GHz ISM, and/or mm-Wave) at each moment of wireless transmission and reception should be activated simultaneously to deliver multiple data streams from a digital baseband processor, with high data rates and robustness for one or multiple users while the channel availability remains. US20160248451A1 describes a transceiver architecture for millimeter wave wireless communications. The transceiver architecture includes two transceiver chip modules configured to communicate in different frequency ranges. The first transceiver chip module includes a baseband sub-module, a first radio frequency front end (RF FE) component and associated antenna array. The second transceiver chip module includes a second RF FE component and associated antenna array. The second transceiver chip module is separate from the first transceiver chip module and is electrically coupled to the baseband sub-module of the first transceiver chip module.

However, in the transceiver architecture described in US20160248451A1 multiple transceiver chip modules are required and operate only in millimeter wave frequency ranges. Also, in using printed circuit board technology, the dual chip implementation of the transceiver architecture described in US20160248451A1 does not provide an area and power efficient design. Embodiments of the present invention seek to address at least one of the above problems.

SUMMARY

In accordance with a first aspect of the present invention, there is provided an apparatus for wireless communication, comprising two or more transceiver array groups, each transceiver array group comprising one or more radio frequency, RF, circuits, and one or more RF front end, RF FE, circuits; wherein the transceiver array groups are configured to operate at different frequencies; wherein the transceiver array groups are configured to be connected to one corresponding digital baseband processor; and wherein the transceiver array groups comprise at least one first transceiver array group configured to operate at cm wavelength or larger. Preferably, the transceiver array groups comprise at least one second transceiver array group configured to operate at mm wavelength.

In accordance with a second aspect of the present invention, there is provided a method for wireless communication, the method comprising the steps of operating two or more transceiver array groups, each transceiver array group comprising one or more radio frequency, RF, circuits, and one or more RF front end, RF FE, circuits and being configured to be connected to one corresponding digital baseband processor, at different frequencies; and operating at least one first transceiver array group of the transceiver array groups at cm wavelength or larger.

In accordance with a third aspect of the present invention, there is provided a method of fabricating the apparatus of the first aspect, the method comprising fabricating both CMOS and III-V semiconductor devices on a single die.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention can provide an RF architecture of highly integrated multiple wireless transceivers enabling carrier aggregation (CA), multiple input and multiple output (MIMO), and beamforming for 5G mobile and fixed wireless communication, by leveraging a III-V and Si monolithic integrated process to substantially reduce area and power. The integrated wireless transceivers can include both transmitters and receivers, as well as RF front-end circuits such as low noise amplifiers (LNAs), power amplifiers (PAs), RF switches, and phase shifters interfacing various RF and phased array antennas, which can also be realized together with existing 4G communication circuits further increasing the level of integration on a single wafer.

The RF architecture of highly integrated multiple wireless transceivers according to example embodiments can advantageously be realized using a fabrication process that deposits both III-V and CMOS devices and circuits on a single wafer, providing a small form factor and low power consumption for both a base station and a mobile device.

More specifically, example embodiments of the present invention provide a structure of transceivers array groups for both mm-Wave & cm-Wave carrier aggregation/MIMO, that can be integrated on a single die or wafer using existing fabrication processes. As will be described in more detail below with reference to FIG. 7, in an example embodiment the CMOS/III-V boundary 700 on the single chip radio 702 for a corresponding digital baseband processor 703 is preferably determined by the operating frequency of the transceivers array groups 704, 706, 708 as well as the structure of the transceivers groups 704, 706, 708. In the example embodiment shown in FIG. 7, all the RF1 e.g. 710 and Front-End1 e.g. 712 circuits operating at e.g. 1 GHz or under can be designed using CMOS only. The RF2 e.g. 714 and Front-End2 e.g. 716 circuits operating at e.g. 5 GHz with the Type-1 RF transceiver structure described below with reference to FIG. 3(a) can be designed using both CMOS and III-V. In the example embodiment shown in FIG. 7, all the RF2 e.g. 714 circuits can be implemented using CMOS only while all the Front-End2 e.g. 716 circuits can be implemented using both III-V and CMOS. The RF3 e.g. 718 and Front-End3 e.g. 720 circuits operating at 28 GHz or higher with the Type-2 RF transceiver structure described below with reference to FIG. 3(b) can also be designed using both CMOS and III-V. However, in the example embodiment shown in FIG. 7 some of the RF3 circuits e.g. 718 can be implemented using both III-V and CMOS depending on their high frequency performance and/or circuit topology. All the Front-End3 e.g. 720 circuits can also be implemented using both III-V and CMOS. Overall, the III-V portion of the whole chip 702 design is located about 0~1 μm below the surface of the CMOS portion of the design according to an example embodiment, and CMOS and III-V parts are connected together through metal lines transversing the CMOS/III-V boundary 700 on a single semiconductor die or wafer.

Figure 2:
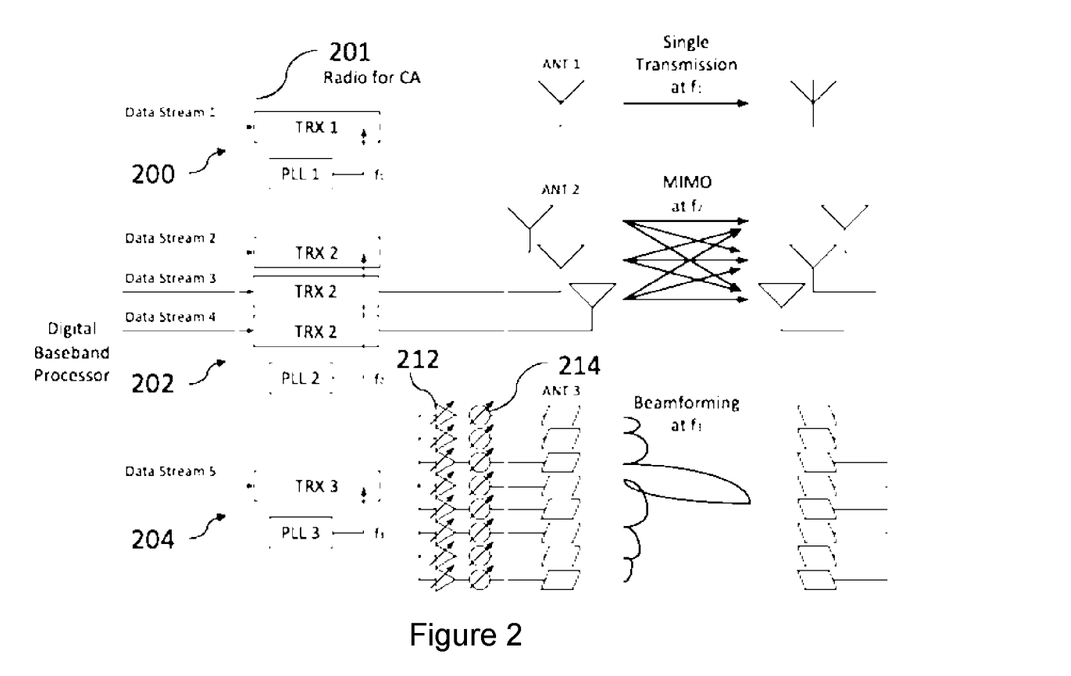
FIG. 2 shows a block diagram illustrating a radio with multiple RF transceiver array groups for carrier aggregation (CA), according to an example embodiment.

As mentioned in the background section, for mobile speeds of 20 Gbps, 5G NR will use CA fully utilizing available frequency slots and bandwidth with an appropriate communication scheme at each carrier frequency. FIG. 2 shows an example embodiment of a radio 201 with multiple RF transceiver array groups 200, 202, 204 of one or more transceivers each (i.e. TRX1, TRX2, TRX3) for carrier aggregation (CA) with different wireless transmission techniques operating simultaneously at different frequencies.

Specifically, FIG. 2 depicts an example embodiment of a radio 201 with integrated multiple RF transceiver array groups 200, 202, 204 supporting CA using three different carrier frequencies, $f_1$, $f_2$, and $f_3$. In this embodiment, $f_1$ is sub-1 GHz, f2 is unlicensed 5 GHz, and f3 is 28 GHz assigned for 5G mm-Wave. At f1, traditional single radio (TRX1) transmission is used with a bit large sized antenna (ANT1), while MIMO is used with multiple RF transceivers (TRX2) and antennas (ANT2) at $f_2$ to maximize the channel capacity in the unlicensed 5 GHz frequency band. At $f_3$, due to the shorter wavelength of the mm-Wave signals, phased array antennas (ANT3) can be implemented in a smaller area with phase and amplitude control blocks, e.g. 212, 214, respectively, in addition to the RF transceiver (TRX3).

Figure 3:
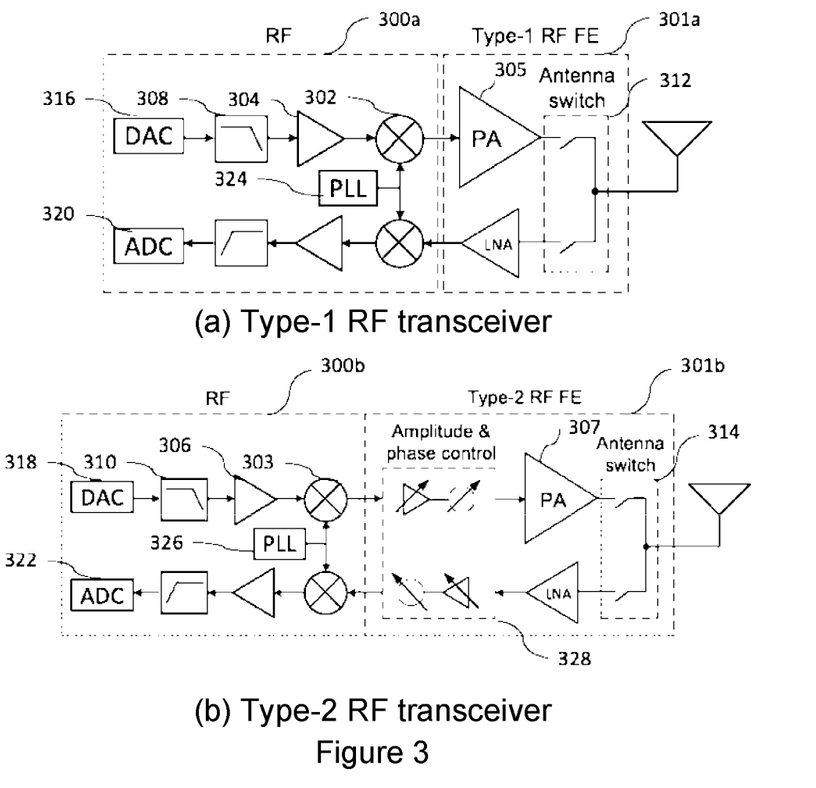
FIG. 3(a) shows a block diagram illustrating a wireless transmitter and receiver block illustrating an RF channel with a conventional RF front-end (RF FE), of the radio of FIG. 2.
FIG. 3(b) shows a block diagram illustrating a wireless transmitter and receiver block illustrating an RF channel with amplitude and phase control blocks for beam-forming or massive MIMO, of the radio of FIG. 2.

More detailed block diagrams of transceivers TRX1, TRX2, TRX3 of FIG. 2 are shown in FIG. 3(a) or (b) depending on their antenna configuration. Each RF channel is depicted as comprising an RF circuit 300a, 301a, and an RF Front-End (RF FE) circuit e.g. 300b, 301b. In each RF channel there are frequency conversion blocks e.g. 302, 303 (i.e. up-mixers and down-mixers), amplifiers e.g. 304-307, filters e.g. 308, 310, switches e.g. 312, 314, digital-to-analog converters e.g. 316, 318 and analog-to-digital converters e.g. 320, 322, and a frequency generation block e.g. 324, 326 (i.e. PLL), as will be appreciated by a person skilled in the art. In FIG. 3(a) an RF channel with a conventional Type-1 RF front-end (FE) 301a is shown. In the case of using phased array antennas or massive MIMO technique, amplitude and phase control 328 functionality is added to each Type-2 RF FE circuit e.g. 301b, for analog beamforming, as shown in FIG. 3(b). If a digital beamforming technique is adopted in different embodiments, the amplitude and/or phase control 328 functionality can be implemented in a digital baseband processor, using high performance and high power-consuming digital-to-analog converters e.g. 316, 318 and analog-to-digital converters e.g. 320, 322 in such embodiments.

In embodiments of the present invention, a radio is provided with multiple RF array groups corresponding to a single baseband processor supporting carrier aggregation and including both Type-1 transceivers shown in FIG. 3(a) and Type-2 transceivers shown in FIG. 3(b).

Figure 4:
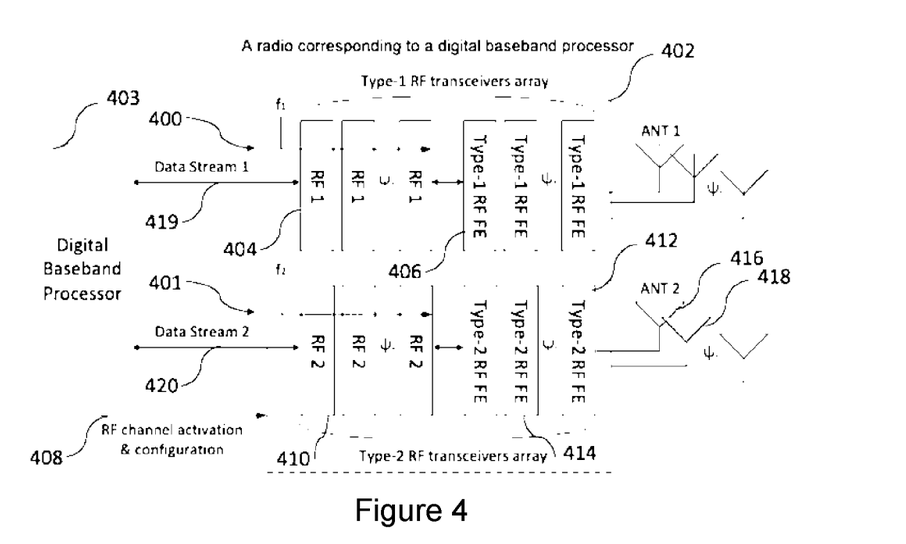
FIG. 4 shows a block diagram illustrating a radio with multiple RF transceiver array groups, according to an example embodiment.
Figure 5:
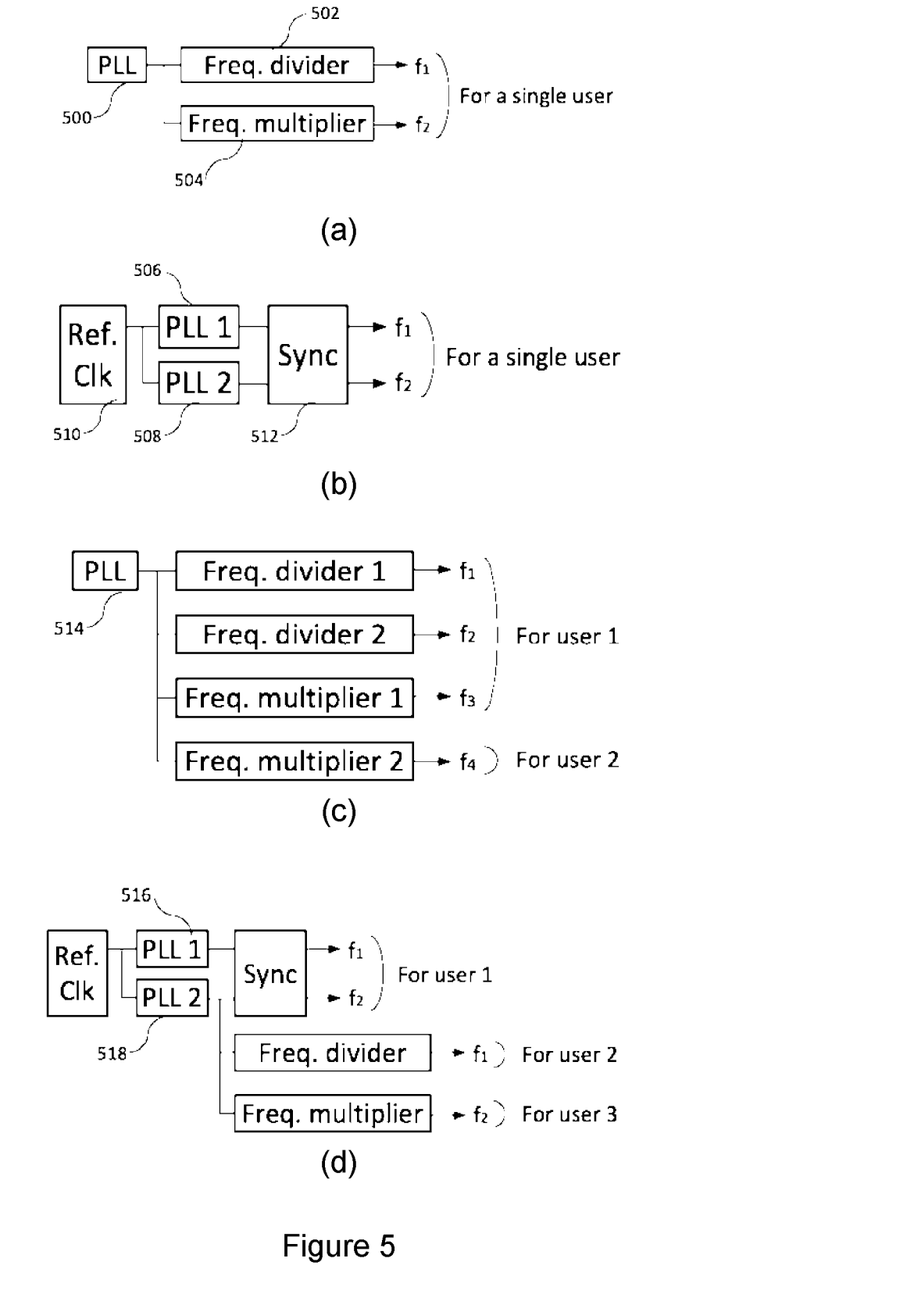
FIG. 5(a) to (d) show block diagrams illustrating multiple carrier frequencies generation with (a) a single phase-locked loop, (PLL), (b) multiple PLLs, (c) a single PLL for multiple users, (d) multiple PLLs for multiple users, according to example embodiments.

FIG. 4, as an example embodiment, depicts two RF transceiver array groups 400, 401, where both Type-1 and Type-2 transceivers build a radio 402 corresponding to a single digital baseband processor 403 that is capable of running carrier aggregation function at two different carrier frequencies. More array groups at different frequency bands can be integrated together in different embodiments, and any number of RF channels (e.g. RF 1 circuit 404 and Type-1 RF FE circuit 406) in each RF array group e.g. 400 with appropriate antenna configurations can be activated simultaneously and automatically configured through control signals 408 from the digital baseband processor 403 in which the control signals 408 are generated based on the computation about wireless channel conditions and availability. The Type-2 RF transceivers array group 401 with ANT2 in the example embodiment shown in FIG. 4 can also be used for massive MIMO and/or beamforming for a single or multiple users. In the example embodiment shown in FIG. 4, one RF2 circuit e.g. 410 may be connectable to one or more Type-2 RF FE's circuits e.g. 412, 414 and antennas (ANT2) e.g. 416, 418, in which the amplitude and phase control circuitry 328 described above with reference to in FIG. 3(b) can be integrated with (or embedded in) a power amplifier (PA), a low noise amplifier (LNA), and/or an antenna switch. In an example embodiment, different carrier frequencies for activated RF channels for a single user are preferably synchronized to transmit and receive multiple data streams e.g. 419, 420 from the single baseband processor 403 at the same time. Thus, $f_1$ and $f_2$ in FIG. 4 (or more carrier frequencies) are preferably generated from a single frequency synthesizer or phase-locked loop (PLL) 500 with frequency division 502 and/or multiplication 504 functional blocks, as depicted in FIG. 5 (a). In other example embodiments, multiple PLLs 506, 508 for different frequency bands can be synchronized using a single reference clock source 510 and a phase synchronization block 512 shown in FIG. 5(b), in either a transmitter or a receiver, or both. FIGS. 5(c) and (d) show examples for multiple-user cases, specifically in FIG. 5(c) a single PLL 514 for multiple users, and in FIG. 5(d) multiple PLLs 516, 518 for multiple users. In implementing a radio with multiple RF transceiver array groups according to example embodiments of the present invention, designers can face two challenges—form-factor and power consumption—especially in a mobile device.

Figure 6:
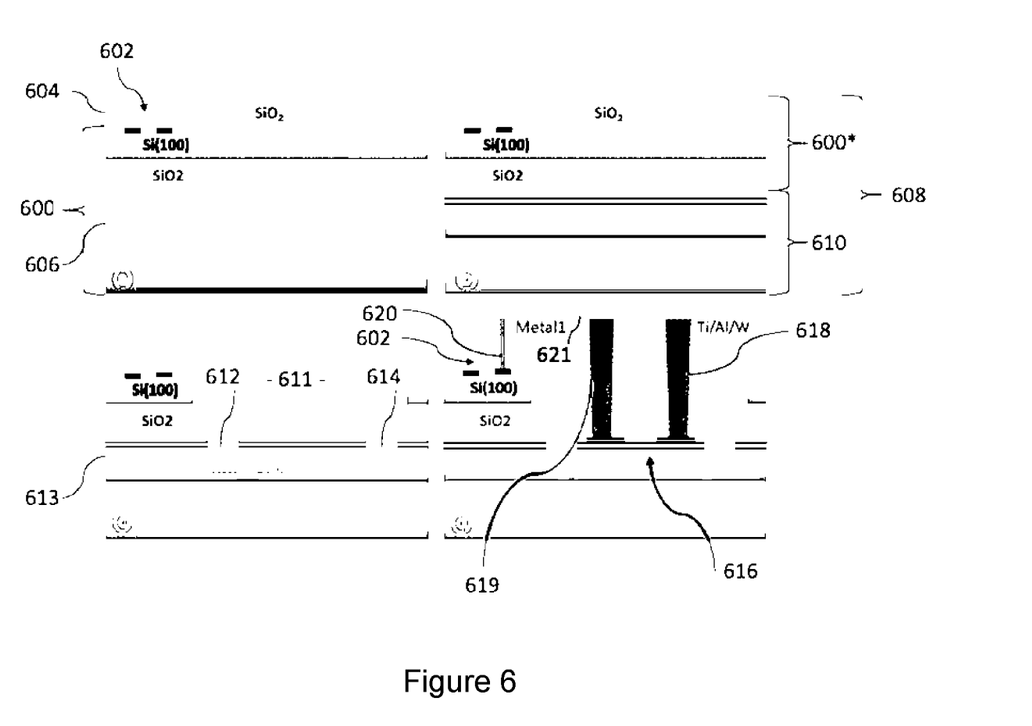
FIG. 6(a) to (d) show schematic cross-sectional views of monolithically integrated III-V (e.g. GaN, GaAs, or InGaAs) with Si CMOS fabrication of a radio with multiple RF transceiver array groups, according to an example embodiment.

In some example embodiments, a unique fabrication process is leveraged, the LEES (Low Energy Electronics Systems) process [1-6], where both CMOS and III-V semiconductor devices can be fabricated on a single die as shown in FIG. 6. This advantageously allows the use of the most suitable III-V devices/circuits [7] grown below conventional CMOS devices/circuits, interfaced via metal layers. Such single-die integration can advantageously offer the superior performance required by 5G specifications at the small form factor and within the tight power budget of a smartphone implementation.

For details of the LEES process, reference is made to [1-6] for various example process steps with associated fabrication techniques and conditions as described therein, which can be applied in fabricating a radio with RF transceiver array groups on a single wafer/chip according to example embodiments. One non-limiting example of an LEES fabrication process for fabrication of a radio with RF transceiver array groups according to example embodiments will be described below with reference to FIG. 6.

More specifically, FIG. 6(a) to (d) show schematic cross-sectional views of the monolithically integrated III-V (e.g. GaN high electron mobility transistor (HEMT)) with Si CMOS process used according to an example embodiment: FIG. 6 (a) shows a silicon-on-insulator (SOI) wafer 600 with fabricated Si devices 602. As will be appreciated by a person skilled in the art, the Si devices may be formed by inserting the wafer 600 into a front-end CMOS process. Following removal of the partially processed wafer 600 with the fabricated Si devices 602, an oxide layer 604 is formed on the partially processed wafer 600 in this example embodiment. The wafer 600 is then flipped and temporarily attached to a handle wafer (not shown), and a Si CMOS/GaN-on-Si wafer 608 is realized by two-step bonding technology, as shown in FIG. 6 (b). In this example embodiment, the two-step bonding technology involves first attaching the handle wafer to the partially processed wafer 600, for example by wafer bonding at elevated temperatures greater than or equal to 450 degrees Celsius. Following removal of the bulk Si 606 of the wafer 600, the remaining flipped partially processed wafer 600* is attached to a GaN-on-Si wafer 610, for example by wafer bonding at elevated temperatures equal to or greater than the temperature at which the GaN HEMT devices are subsequently formed, forming the Si CMOS/GaN-on-Si wafer 608.

As shown in FIG. 6 (c) GaN window(s) 611 are then opened to expose the non-silicon device layer(s) 613 and device isolation 612, 614 are formed by, for example by having a distance between CMOS and III-V regions or by forming a n-well with a DC bias. Non-silicon devices and plugs or vias for making contact are formed in the window(s) 611 and the Si CMOS/GaN-on-Si wafer 608 is re-inserted into the CMOS process for back end CMOS processing. FIG. 6 (d) shows a schematic cross-sectional view of the monolithically integrated GaN HEMT devices 616 after removal from the CMOS back-end processing with final metal interconnection e.g. 618-621 of fabricated HEMT devices 616 and Si CMOS devices 602.

Figure 7:
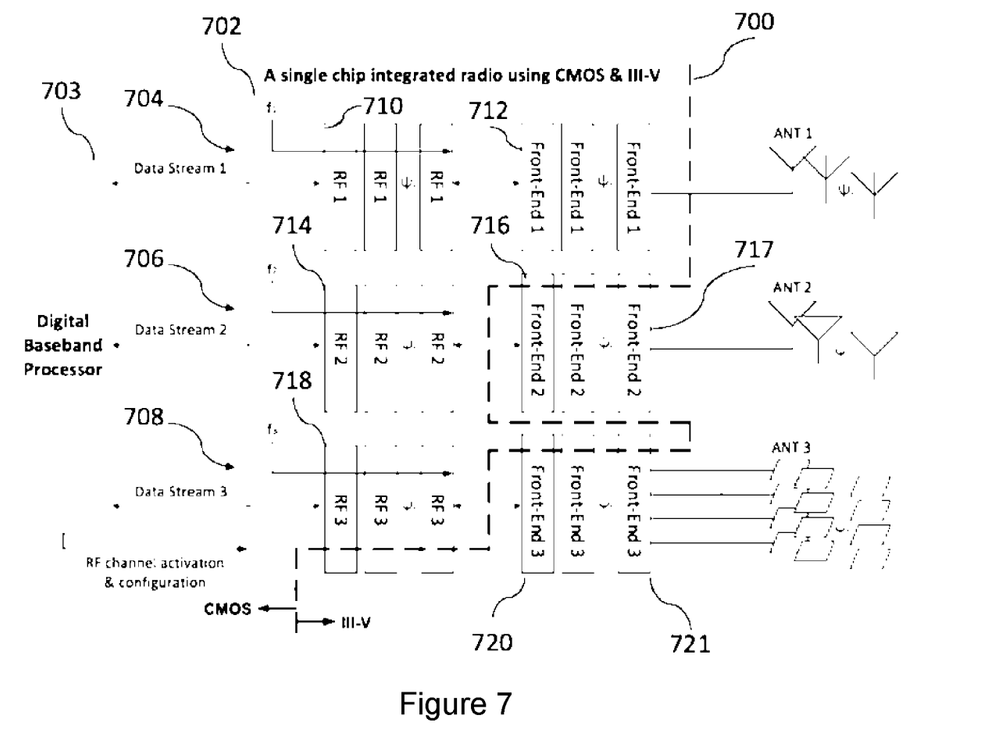
FIG. 7 shows a block diagram illustrating a single chip integrated radio with multiple RF transceiver groups, according to an example embodiment.

FIG. 7 depicts another example embodiment of a single chip radio 702 including RF transceiver array groups 704, 706, 708 with both Type-1 RF transceivers (i.e. RF 1 circuits e.g. 710 and Type-1 RF FE circuits e.g. 712) and Type-2 RF transceivers (i.e. RF 2 circuits e.g. 714 and Type-2 RF FE circuits e.g. 716), in which low frequency blocks can be implemented using CMOS process technology while high frequency and high power blocks including PA, LNA, antenna switch, and amplitude/phase control circuitry can be implemented using III-V technology on a single wafer for single chip 702 design, by means of the LEES process. Data Stream 1, 2, and 3 from the digital baseband processor 703 in FIG. 7 can be independently used for two or more users (i.e. multi-user), for which the generated carrier frequencies, $f_1$, $f_2$, and $f_3$, can also be independent. However, if all the data streams are used for a single user to improve data rates and/or robustness, all the generated carrier frequencies should be synchronized, as described above with reference to FIG. 5.

Advantageously, the single chip integrated radio 702 according to an example embodiment with RF transceiver array groups 704, 706, 708, fabricated using e.g. the LEES process described above with reference to FIG. 6, can support massive MIMO, beamforming, and carrier aggregation with multiple antenna configurations for one or more users.

In the example embodiment shown in FIG. 7, multiple transceiver array groups operating in any frequency ranges including millimeter wave (e.g. 28 or 60 GHz for transceiver array group 708), centimeter wave (e.g. 2.4 or 5 GHz for transceiver array group 706), and sub-1 GHz for transceiver array group 704, can advantageously be provided. In one embodiment, one or more simple Type-1 RF transceivers forming one array group operating at low frequency ranges (e.g. sub-6 GHz), e.g. transceiver array groups 702 and 704, can be integrated with one or more Type-2 RF transceivers forming another array group operating at millimeter wave frequency ranges, e.g. transceiver array group 708, in a single communication apparatus, preferably in a single chip apparatus.

In the RF transceiver array groups 704, 706, 708, i.e. including those operating in millimeter wave frequency ranges, example embodiments of the present invention can support more flexible configuration between RF circuits and RF front-end circuits (either Type-1 or Type-2). For example, in the embodiment shown in FIG. 7, one RF3 circuit e.g. 718 can be selectively connected to multiple Front-End3 circuits e.g. 720, 721 for analog beamforming and each RF2 circuit e.g. 714 can be selectively connected to one or multiple Front-End2 circuits e.g. 716, 717 for digital beamforming or massive MIMO.

Figure 8:
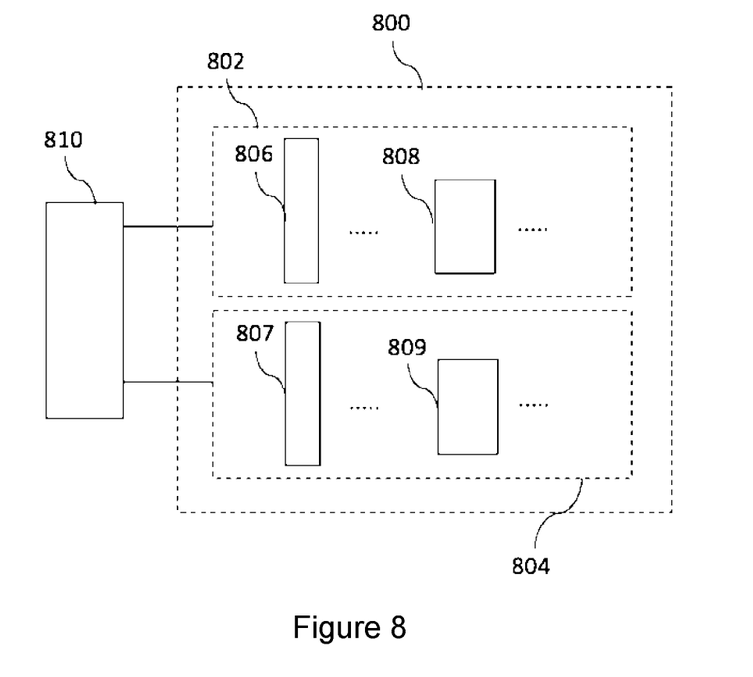
FIG. 8 shows a block diagram illustrating an apparatus for wireless communication, according to an example embodiment.

FIG. 8 shows a block diagram illustrating an apparatus 800 for wireless communication, according to an example embodiment. The apparatus comprises two or more transceiver array groups 802, 804, each transceiver array group 802, 804 comprising one or more radio frequency, RF, circuits, 806, 807 and one or more RF front end, RF FE, circuits 808, 809 wherein the transceiver array groups 802, 804 are configured to operate at different frequencies; wherein the transceiver array groups 802, 804 are configured to be connected to one corresponding digital baseband processor 810; and wherein the transceiver array groups 802, 804 comprise at least one first transceiver array group 802 configured to operate at cm wavelength or larger.

The transceiver array groups 802, 804 may comprise at least one second transceiver array group 804 configured to operate at mm wavelength.

The transceiver array groups 802, 804 may be configured to enable selective coupling of each RF circuit e.g. 806 of one transceiver array group 802 to one or more of the RF FE circuits e.g. 808 of the same transceiver array group 802.

One or more of the RF FE circuits e.g. 808 may comprise phase and amplitude control blocks. One or more of the transceiver array groups 802, 804 may be configured to support multiple-input-multiple-output, MIMO, or massive MIMO.

One or more of the transceiver array groups 802, 804 may be configured to support analogue beamforming, digital beamforming, or hybrid analogue/digital beamforming.

One or more of the transceiver array groups 802, 804 may be configured to support carrier aggregation.

The transceiver array groups 802, 804 may be implemented on a single chip. The single chip may comprise both complementary metal-oxide-semiconductor, CMOS, and III-V semiconductor devices.

The apparatus 800 may further comprising the corresponding digital baseband processor 810.

Figure 9:
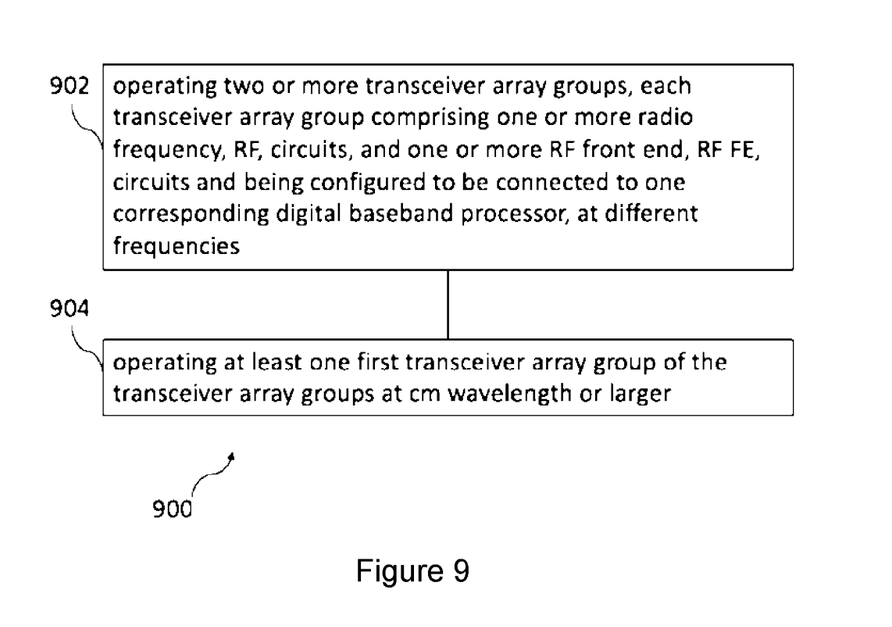
FIG. 9 shows a flow-chart illustrating a method for wireless communication, according to an example embodiment.

FIG. 9 shows a flow-chart 900 illustrating a method for wireless communication, according to an example embodiment. At step 902, two or more transceiver array groups, each transceiver array group comprising one or more radio frequency, RF, circuits, and one or more RF front end, RF FE, circuits and being configured to be connected to one corresponding digital baseband processor, are operated at different frequencies. At step 904, at least one first transceiver array group of the transceiver array groups is operated at cm wavelength or larger. The method may comprise operating at least one second transceiver array group of the transceiver array groups at mm wavelength.

The method may comprise selectively coupling each RF circuit of one transceiver array group to one or more of the RF FE circuits of the same transceiver array group.

The method may comprise phase and amplitude control in one or more of the RF FE circuits.

The method may comprise supporting multiple-input-multiple-output, MIMO, or massive MIMO using the one or more of the transceiver array groups.

The method may comprise supporting analogue beamforming, digital beamforming, or hybrid analogue/digital beamforming using one or more of the transceiver array groups.

The method may comprise performing carrier aggregation using one or more of the transceiver array groups.

The method may comprise implementing the transceiver array on a single chip. The single chip may comprise both complementary metal-oxide-semiconductor, CMOS, and III-V semiconductor devices.

In one embodiment, a method of fabricating the apparatus described above with reference to FIG. 8 is provided, the method comprising fabricating both CMOS and III-V semiconductor devices on a single die.

The method may comprise using low energy electronics systems, LEES, processing. Industrial applications of example embodiments include:

1. Wireless transceivers for 4G, 5G, and next generation smart phones and base stations 2. Wireless communication devices that support carrier aggregation in wide frequency ranges In some example embodiments, an area- & power-efficient single chip integration of those multiple RF transceiver array groups using the LEES CMOS+III-V semiconductor process is advantageously provided. High level of integration of multiple RF channels and RF front-ends on a single wafer according to example embodiments of the present invention can advantageously provide more flexible configurations, as described herein.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims.

Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. An apparatus for wireless communication, comprising:
    two or more transceiver array groups, each transceiver array group comprising one or more radio frequency, RF, circuits, and one or more RF front end, RF FE, circuits;
    wherein the transceiver array groups are configured to operate at different frequencies;
    wherein the transceiver array groups are configured to be connected to one corresponding digital baseband processor;
    wherein the transceiver array groups comprise at least one first transceiver array group configured to operate at cm wavelength or larger; and
    wherein the transceiver array groups are configured to enable selective coupling of each RF circuit of one transceiver array group to one or more of the RF FE circuits of the same transceiver array group and vice versa.

2. The apparatus of claim 1, wherein the transceiver array groups comprise at least one second transceiver array group configured to operate at mm wavelength.

3. The apparatus of claim 1, wherein one or more of the RF FE circuits comprise phase and amplitude control blocks.

4. The apparatus of claim 1, wherein one or more of the transceiver array groups are configured to support multiple-input-multiple-output, MIMO, or massive MIMO.

5. The apparatus of claim 1, wherein one or more of the transceiver array groups are configured to support analogue beamforming, digital beamforming, or hybrid analogue/digital beamforming.

6. The apparatus of claim 1, wherein one or more of the transceiver array groups are configured to support carrier aggregation.

7. The apparatus of claim 1, wherein the transceiver array groups are implemented on a single chip.

8. The apparatus of claim 7, wherein the single chip comprises both complementary metal-oxide-semiconductor, CMOS, and III-V semiconductor devices.

9. The apparatus of claim 1, further comprising the corresponding digital baseband processor.

10. A method for wireless communication, the method comprising the steps of:
    operating two or more transceiver array groups, each transceiver array group comprising one or more radio frequency, RF, circuits, and one or more RF front end, RF FE, circuits and being configured to be connected to one corresponding digital baseband processor, at different frequencies;
    operating at least one first transceiver array group of the transceiver array groups at cm wavelength or larger, and
    selectively coupling each RF circuit of one transceiver array group to one or more of the RF FE circuits of the same transceiver array group and vice versa.

11. The method of claim 10, comprising operating at least one second transceiver array group of the transceiver array groups at mm wavelength.

12. The method of claim 10, comprising phase and amplitude control in one or more of the RF FE circuits.

13. The method of claim 10, comprising supporting multiple-input-multiple-output, MIMO, or massive MIMO using the one or more of the transceiver array groups.

14. The method of claim 10, comprising supporting analogue beamforming, digital beamforming, or hybrid analogue/digital beamforming using one or more of the transceiver array groups.

15. The method of claim 10, comprising performing carrier aggregation using one or more of the transceiver array groups.

16. The method of claim 10, comprising implementing the transceiver array on a single chip.

17. The method of claim 16, wherein the single chip comprises both complementary metal-oxide-semiconductor, CMOS, and III-V semiconductor devices.

18. A method of fabricating the apparatus of claim 1, the method comprising fabricating both CMOS and III-V semiconductor devices on a single die.

19. The method of claim 18, comprising using low energy electronics systems, LEES, processing.

* * * * *